United States Patent
Swaminathan

[11] 4,060,306
[45] Nov. 29, 1977

[54] ACHROMATIC APL.

[75] Inventor: Krishnaiyer Swaminathan, Williamsville, N.Y.

[73] Assignee: American Optical Corporation, Southbridge, Mass.

[21] Appl. No.: 532,988

[22] Filed: Dec. 16, 1974

[51] Int. Cl.² .................................... G02B 21/08
[52] U.S. Cl. .......................... 350/87; 350/229
[58] Field of Search ............ 350/87, 175 ML, 229

[56] References Cited

U.S. PATENT DOCUMENTS

| B 425,035 | 1/1975 | Dehlink ........................... 350/229 |
| 1,860,430 | 5/1932 | Poser ................................ 350/87 |
| 3,421,808 | 1/1969 | Gottlieb .......................... 350/87 |
| 3,790,254 | 2/1974 | Rybicki et al. ............... 350/229 X |

Primary Examiner—David H. Rubin
Attorney, Agent, or Firm—H. R. Berkenstock; A. H. Spencer

[57] ABSTRACT

An Achromatic Aplanatic Condenser having a numerical aperture of 1.30 has 3 components.

1 Claim, 1 Drawing Figure

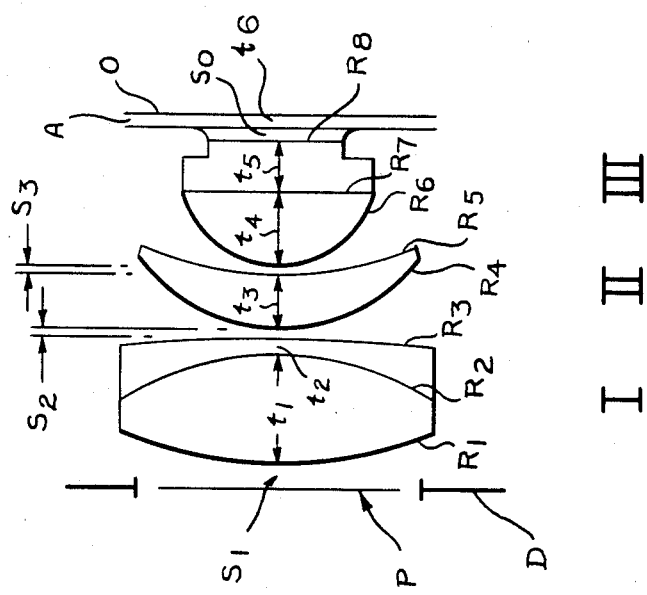

ACHROMATIC APLANATIC CONDENSER

BACKGROUND OF THE INVENTION

This invention relates to microscope condensers and in particular to an achromatic aplanatic condenser having a numerical aperture of 1.30 which uniformaly fills a field of 2.4mm diameter at the object plane of the microscope.

It is an object of the present invention to provide a 3 component achromatic condenser having a numerical aperture of 1.30 which is well corrected for spherical and chromatic aberrations.

It is another object of the present invention to provide a microscope condenser having a front focal plane external to the condenser unit.

It is still further an object of the present invention to provide illumination at the object plane of the microscope with substantially parallel rays or pencils of light.

DRAWING

The drawing is an optical diagram of a microscope condenser.

DESCRIPTION

Referring now to the drawing, pupil plane P is shown in the illumination system (not shown) of the microscope (not shown) with aperture diagram D lying in the same plane as the pupil plane of the condenser. The condenser comprises 3 components. A double convex positive doublet I; a meniscus singlet II and a convex plano doublet III provide in combination a greatly simplified condenser system having the advantages of much more complex prior art condensers. Lens parameters as shown in the drawing, have been given the following identifications: axial air spaces have been designated $S_1$ to $S_3$; axial thickness are designated $T_1$ to $T_6$; lens radii are designated $R_1$ to $R_8$, with a minus sign (−) applies to surfaces whose center of curvature lie on the side of their vertices toward the pupil plane, refractive indices are designated ND(1) to ND(6) and Abbe numbers are designated $\gamma$ (1) to $\gamma$ (6) and So is the axial thickness of the immersion oil.

The values of radius, thickness, air space and oil thickness are in mm and the values for indices of refractions and Abbe numbers are absolute values.

The Table presents the preferred embodiment of the present invention.

| Lens | Radius | Thickness | Space | Refractive Index | Abbe No |
|---|---|---|---|---|---|
| | | | $S_1$ = 1.526 | | |
| | $R_1$ = 38.54 | | | | |
| I | | $T_1$ = 8.73 | | $ND_1$ = 1.6203 | $\gamma_1$ = 60.3 |
| | $R_2$ = −24.33 | | | | |
| | | $T_2$ = 1.50 | | $ND_2$ = 1.786 | $\gamma_2$ = 25.5 |
| | $R_3$ = −169.084 | | | | |
| | | | $S_2$ = 0.10 | | |
| | $R_4$ = 13.48 | | | | |
| II | | $T_3$ = 4.77 | | $ND_3$ = 1.6203 | $\gamma_3$ = 60.3 |
| | $R_5$ = 32.96 | | | | |
| | | | $S_3$ = 0.10 | | |
| | $R_6$ = 7.77 | | | | |
| | | $T_4$ = 6.13 | | $ND_4$ = 1.651 | $\gamma_4$ = 55.8 |
| III | $R_7$ = ∞ | | | | |
| | | $T_5$ = 4.12 | | $ND_5$ = 1.786 | $\gamma_5$ = 25.5 |
| | $R_8$ = ∞ | | | | |
| | IMMERSION OIL | | So = 0.4177 | $ND_0$ = 1.515 | $\gamma_0$ = 43.6 |
| | OBJECT SUPPORT A | $T_6$ = 1.25 | | $ND_6$ = 1.524 | $\gamma_6$ = 58.3 |

In the above Table the preferred values for the immersion oil thickness, refractive index and Abbe number as well as the object support glass thickness, refractive index and Abbe number have been given. These values do not form a part of the present invention but have been provided as a part of the best mode of practicing the same.

What is claimed is:

1. An achromatic aplanatic condenser having a numerical aperture of 1.30 which is well corrected for spherical and chromatic aberrations and capable of uniformly filling a field of about 2.4mm in diameter which comprises, a double convex doublet consisting of a double convex singlet cemented to a concavo-convex singlet as the first component, a meniscus lens as the second component and a convex plano doublet as the third component all being aligned along an optical axis and having a front pupil plane external to said condenser, having the following parameters:

| Lens | Radius | Thickness | Space | Refractive Index | Abbe No. |
|---|---|---|---|---|---|
| | | | $S_1$ = 1.526 | | |
| | $R_1$ = 38.54 | | | | |
| I | | $T_1$ = 8.73 | | $ND_1$ = 1.6203 | $\gamma_1$ = 60.3 |
| | $R_2$ = 24.33 | | | | |
| | | $t_2$ = 1.50 | | $ND_2$ = 1.786 | $\gamma_2$ = 25.5 |
| | $R_3$ = −169.084 | | | | |
| | | | $S_2$ = 0.10 | | |
| | $R_4$ = 13.48 | | | | |
| II | | $T_3$ = 4.77 | | $ND_3$ = 1.6203 | $\gamma_3$ = 60.3 |
| | $R_5$ = 32.96 | | | | |
| | | | $S_3$ = 0.10 | | |
| | $R_6$ = 7.77 | | | | |
| | | $T_4$ = 6.13 | | $ND_4$ = 1.651 | $\gamma_4$ = 55.8 |
| III | $R_7$ = ∞ | | | | |
| | | $T_5$ = 4.12 | | $ND_5$ = 1.786 | $\gamma_5$ = 25.5 |
| | $R_8$ = ∞ | | | | | wherein the values for radii, thicknesses, and air spaces are in mm and the refractive indices and Abbe numbers are absolute values.

* * * * *